United States Patent [19]

Vail, III

[11] Patent Number: 4,748,415
[45] Date of Patent: May 31, 1988

[54] METHODS AND APPARATUS FOR INDUCTION LOGGING IN CASED BOREHOLES

[75] Inventor: William B. Vail, III, Bothell, Wash.

[73] Assignee: ParaMagnetic Logging, Inc., Bothell, Wash.

[21] Appl. No.: 857,160

[22] Filed: Apr. 29, 1986

[51] Int. Cl.$^4$ .......................... G01V 3/28; G01V 3/24
[52] U.S. Cl. .................................. 324/339; 324/346; 324/369
[58] Field of Search .............................. 324/338–344, 324/346, 356, 369; 166/66.5; 175/40, 45

[56] References Cited

U.S. PATENT DOCUMENTS

| | | |
|---|---|---|
| 2,220,070 | 11/1940 | Aiken . |
| 2,414,194 | 1/1947 | Ennis . |
| 2,459,196 | 1/1949 | Stewart . |
| 2,587,518 | 2/1952 | Pearson . |
| 2,729,784 | 1/1956 | Fearon . |
| 2,874,348 | 2/1959 | Brant et al. .................. 324/343 |
| 2,891,215 | 6/1959 | Fearon . |
| 3,014,177 | 12/1961 | Hungerford et al. ............ 324/343 |
| 3,051,892 | 8/1962 | Huston . |
| 3,187,252 | 6/1965 | Hungerford .................. 324/346 X |
| 3,277,363 | 10/1966 | Schuster ...................... 324/346 X |
| 3,706,025 | 12/1972 | Regat . |
| 4,278,941 | 7/1981 | Freedman . |
| 4,323,848 | 4/1982 | Kuckes ......................... 324/338 |
| 4,443,762 | 4/1984 | Kuckes ......................... 324/346 |
| 4,455,529 | 6/1984 | Sinclair . |
| 4,465,140 | 8/1984 | Hoehn ........................... 324/346 |
| 4,499,421 | 2/1985 | Sinclair . |
| 4,502,010 | 2/1985 | Kuckes ......................... 324/346 X |
| 4,513,376 | 4/1985 | Barber . |
| 4,529,939 | 7/1985 | Kuckes ......................... 324/369 X |
| 4,593,770 | 6/1986 | Hoehn, Jr. ..................... 324/346 X |

FOREIGN PATENT DOCUMENTS 2148012  5/1985  United Kingdom ............... 324/346

OTHER PUBLICATIONS

Wait et al., Electromagnetic Shielding of Sources Within a Metal-Cased Bore Hole, IEEE Trans. on Geoscience Electronics, vol. GE15, No. 2, p. 108, 1977.

Primary Examiner—Gerard R. Strecker
Attorney, Agent, or Firm—Flehr, Hohbach, Test, Albritton & Herbert

[57] ABSTRACT

Methods and apparatus are disclosed which allow induction logging of geological formations through borehole casing. Longitudinal and azimuthal excitation A.C. magnetic fields applied on the interior of the borehole casing penetrate the walls of the borehole casing under certain circumstances. These A.C. magnetic fields produce eddy currents in the adjacent geological formation, thereby producing secondary A.C. magnetic fields characteristic of the formation. Under certain circumstances, the longitudinal and azimuthal components of the secondary A.C. magnetic fields consequently penetrate to the interior of the casing and are measured to provide the resistivity and changes in the resistivity of the formation.

23 Claims, 5 Drawing Sheets

METHODS AND APPARATUS FOR INDUCTION LOGGING IN CASED BOREHOLES

Much of the invention was disclosed in U.S. Disclosure Document No. 127,101 filed on May 2, 1984 which is included herein by reference.

This invention relates to new methods and apparatus in the field of induction logging which provides measurement of in-situ formation parameters including the resistivity of geological formations through conductive and magnetic steel casing from inside cased well bores.

A search of class 324, subclass 339 provides in excess of 100 U.S. Patents concerned with induction logging of open-hole formations. Typical of the methods and apparatus for open hole induction logging are disclosed in the following U.S. Pat. Nos.: 4,513,376; 4,499,421; 4,455,529; 4,278,941; 3,706,025; 3,051,892; and 2,220,070. However, these disclosures do not present adequate methods and apparatus to function within borehole casing.

A search of Class 324, Subclass 368 provides many U.S. Patents concerned with electrical measurements in the presence of borehole casing. Typical types of measurements involve passing current through the casing and into formation as disclosed in the following U.S. Pat. Nos.: 2,891,215; 2,729,784; 2,587,518; 2,459,196; and 2,414,194. However, these methods and apparatus do not provide magnetic sensing means suitable to measure the effects of such current passage within the cased well bore.

Heretofore, it has been impossible to perform induction logging type measurements inside borehole casing to measure the resistivity of adjacent geological formations. One reason for this is that the response of a typical induction tool depends linearly on the conductivity of adjacent formation volumes, and varies inversely as the radius to that volume to the 6th power (Electrical Methods in Geophysical Prospecting, by George V. Keller and Frank C. Frischknecht, Pergamon Press, New York, Eq. 58, Page 82). The borehole casing is not only close to the induction coils but it is much more conductive than adjacent formations. Therefore, the signal from casing dominates the signal from the formation. And furthermore, variations in the thickness of the casing due to oxidation effects, etc. produce systematic differences in the data which are larger than the formation signal in prior devices. Therefore, prior devices have not provided a means to nullify the relatively large signal coming from the casing to allow the measurement of the formation response.

In addition, the magnetic steel casing has a "skin depth" δ at a particular frequency given by the following equation:

$$\delta = (\rho/\pi f u)^{\frac{1}{2}} \qquad \text{Equation 1.}$$

(Please refer to Fields and Waves in Communication Electronics, by Simon Ramo, et. al., John Wiley & Sons, New York, Second Edition, 1984, Equation 11 on page 149.) Here $\rho$ is the resistivity, f is the frequency and u is the magnetic permeability of the pipe. The magnetic fields are damped exponentially with the skin depth. Typical steel pipes have resistivities of $10^{-7}$ ohm-meters, and relative permeabilities of 100, so that the skin depth equals the thickness of a ½ inch thick pipe at a frequency of 1.6 Hz. The high relative permeability of steel borehole casing allows it to be called "magnetic steel borehole casing". Therefore, since the applied A.C. magnetic field in the induction system must penetrate the walls of the casing to the surrounding earth, frequencies of 20 Hz and lower must be used for such measurements. Heretofore, much higher frequencies are used in open hole systems. Such low frequencies required in a cased hole, however, require a very sensitive induction coil magnetometer which is responsive to low frequency A.C. magnetic fields inside magnetic steel borehole casing. Therefore, an improved downhole induction magnetometer is required for formation resistivity measurements.

The through-casing induction coil magnetometers must be very sensitive to weak A.C. magnetic fields produced by currents caused to flow in formation. However, it is known that the natural geomagnetic noise produces fluctuations in the earth's magnetic field, and in the bandwidth between 0.001 Hz to 20 Hz, the peak-to-peak variations of said geomagnetic noise exceed $1 \times 10^{-5}$ gauss peak-to peak. Heretofore, such noise has provivded a natural limit to measurability of A.C. magnetic fields. However, A.C. magnetic fields from the flowing currents in the earth may be smaller than this magnitude of noise. The invention provides a differential magnetometer, or gradiometer, which allows measurements of A.C. magnetic fields much smaller than the geomagnetic noise present. And furthermore, the invention provides apparatus and methods which allow operation of said sensitive A.C. magnetic gradiometer inside conductive and magnetic steel borehole casing.

And finally, since the steel borehole casing is also magnetic having a relative permeability of approximately 100, the magnetic fields from flowing currents in the vicinity of the borehole casing become substantially distorted by the presence of the casing. Magnetic fields which are perpendicular to the casing are magnetically shielded by the casing. A.C. magnetic fields which are parallel to the casing or longitudinal fields, penetrate the casing to a degree depending on the frequency, the geometry of the casing, the conductivity of the casing, an it's magnetic permeability. At low enough frequencies, such as 1 Hz, appreciable longitudinal components of said A.C. magnetic fields penetrate the casing without any special provisions, a fact which has not been generally recognized in the prior art. However, all other factors being a constant, the relatively high magnetic permeability of the casing tends to concentrate the magnetic field lines inside the casing. To avoid such problems, the invention provides magnetic sensors which are themselves comprised of relatively massive concentrations of highly magnetic materials which dominate the presence of the casing and allow the measurement of weak A.C. magnetic fields through magnetic borehole casing.

Sources of magnetic fields, or excitation fields, on the interior of a cased well bore interact with the surrounding casing and rock formation in complex ways. In the description of this problem, cylindrical coordinates are naturally used. The excitation field may be resolved at any point within the formation into a longitudinal component parallel to the casing, a radial or perpendicular component to the casing and an azimuthal component which is orthogonal to the other directions. In general, for radial components of the excitation field, these components do not penetrate to the exterior of the casing at D.C. or at any frequency because of familiar magnetic shielding arguments. At D.C. and low frequencies, longitudinal components of the excitation field may penetrate the casing, provided eddy current losses in the casing are not too great at the frequency of interest. A finally, for a short length casing, azimuthal excitation fields are transparent to the casing under certain circumstances because of the nearly lossless generation of circulating surface currents which are made to flow continuously on the interior and exterior surfaces of the casing.

For long lengths of casing the azimuthal fields are attenuated by eddy currents.

Therefore, the primary excitation A.C. magnetic fields within the casing may produce longitudinal and azimuthal components of the A.C. magnetic fields on the exterior of the casing. These exterior A.C. magnetic fields in turn cause currents to flow within the formation, as is the case with standard induction logging. These secondary currents then produce secondary A.C. magnetic fields which in turn interact with the casing in a complex fashion. Here, too, longitudinal and azimuthal components of the secondary fields penetrate the casing under certain circumstances. These secondary fields may be measured with various magnetic sensing means as an indication of the nature of the formation and in particular the resistivity of the formation.

Accordingly, an object of the invention is to provide new induction logging methods for formation indentification through borehole casing.

It is yet another object of the invention to provide new and practical induction logging apparatus for formation identification through borehole casing.

And further, it is another objective of the invention to provide new magnetic methods for formation identification through borehole casing.

And still further, it is another object of the invention to provide new magnetic sensing apparatus for formation identification through borehole casing.

Figure 3:
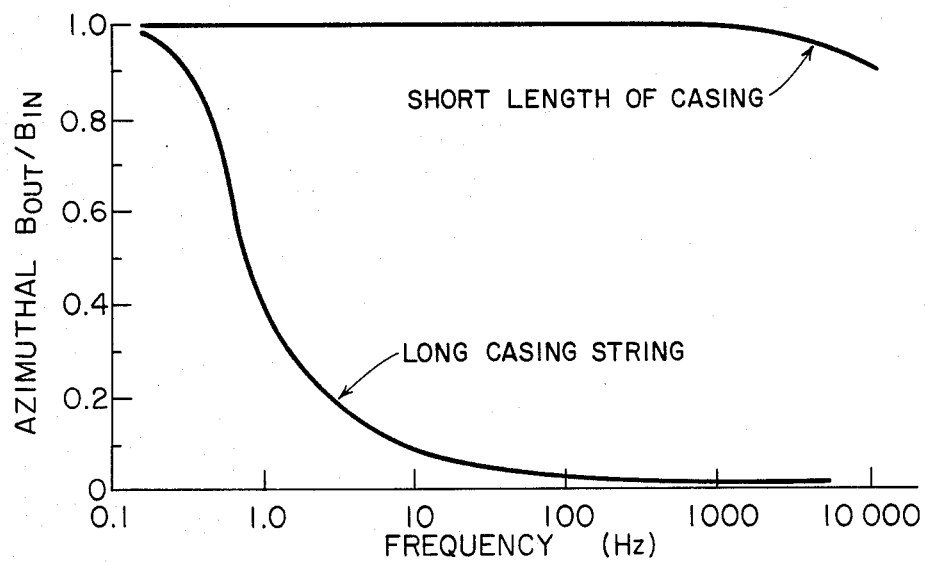
Figure 4:
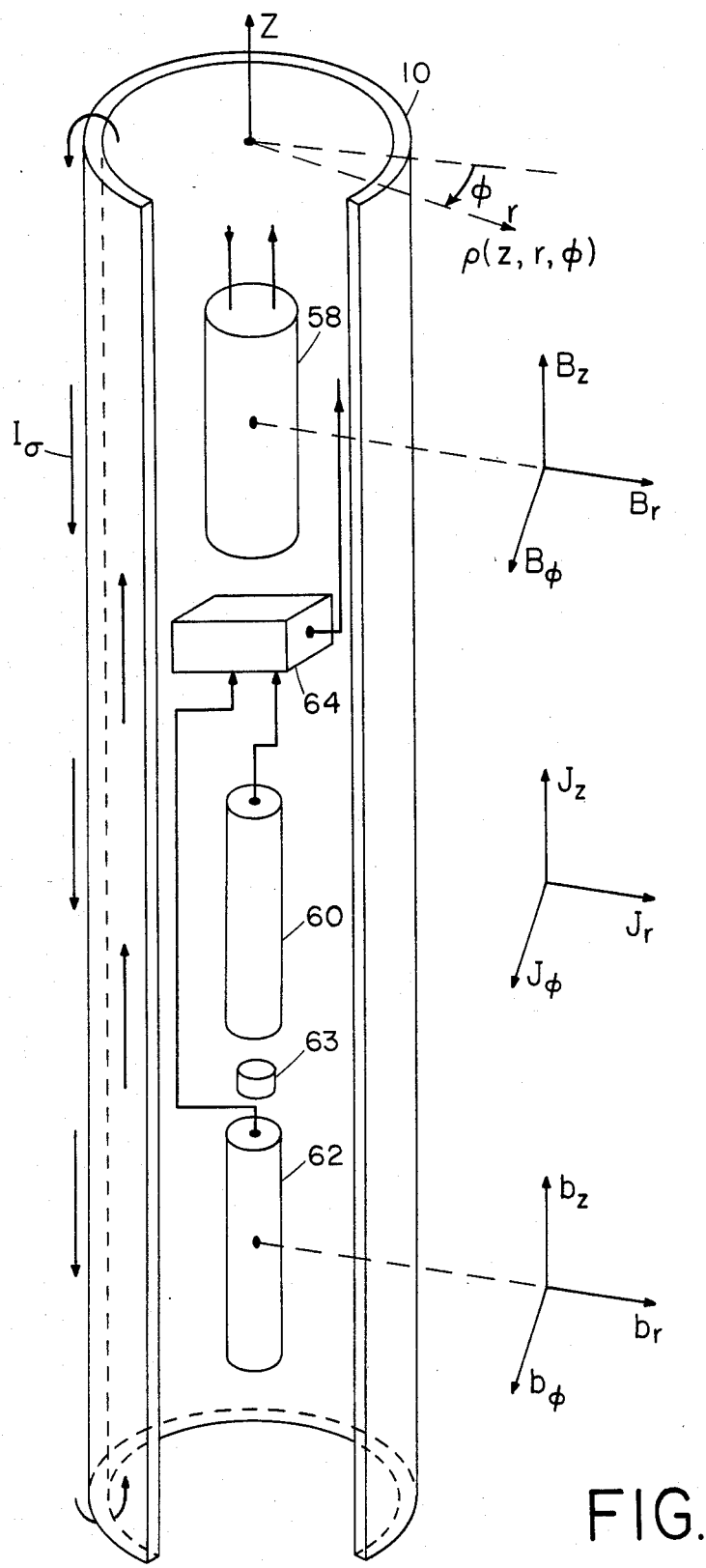

FIG. 3 is a plot of $B_{out}/B_{in}$ vs. frequency for an azimuthal field applied to the interior or several different lengths of borehole FIG. 4 is a generalized conceptual drawing showing the cylindrical components of the primary A.C. magnetic field (the excitation field), the resulting currents flowing in formation, the surface currents flowing on the casing, and the secondary magnetic fields generated by the flowing currents.

Figure 5:
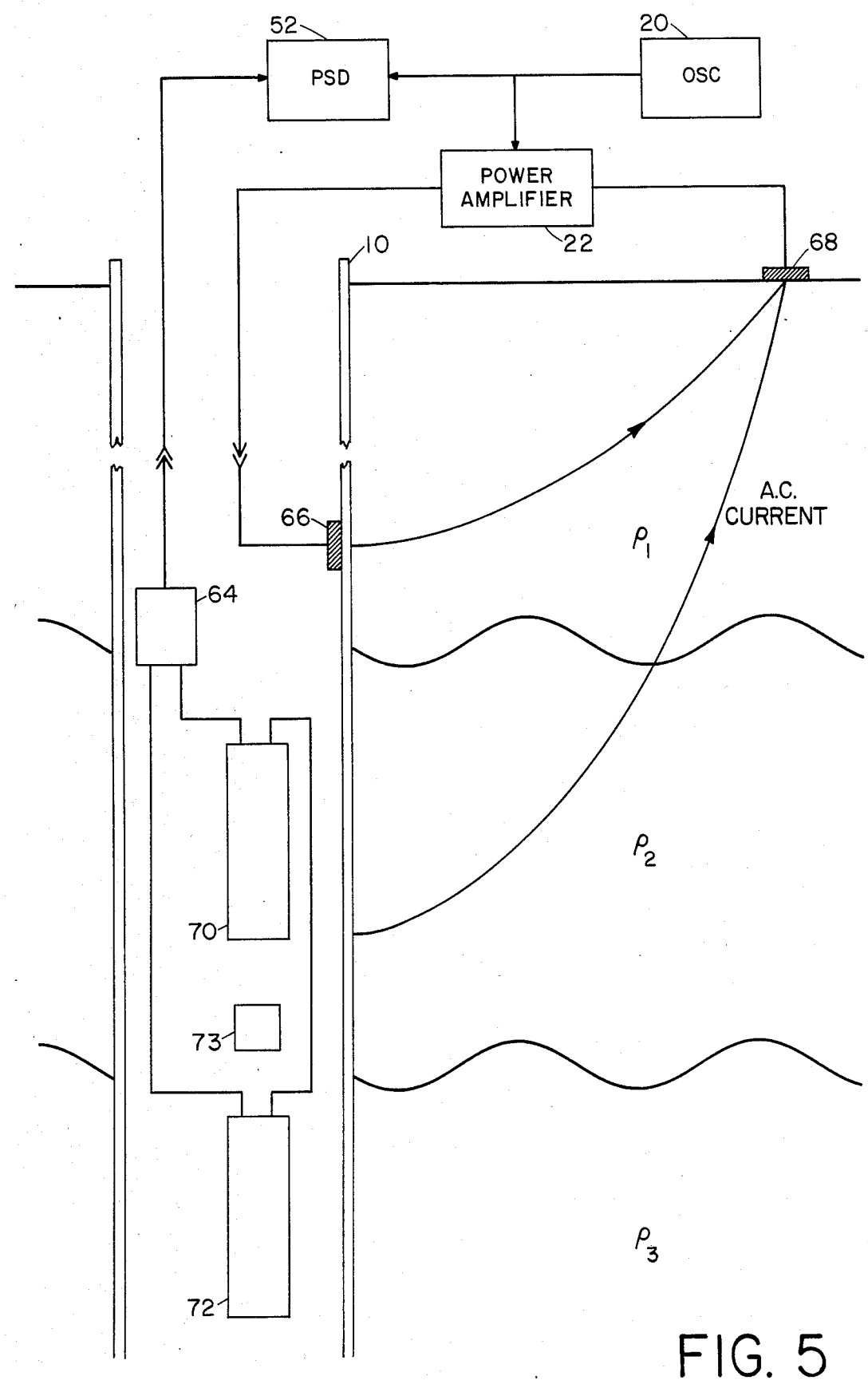

FIG. 5 is another embodiment of the invention wherein the source of the exciting field is derived by passing A.C. current through formation.

Figure 6:
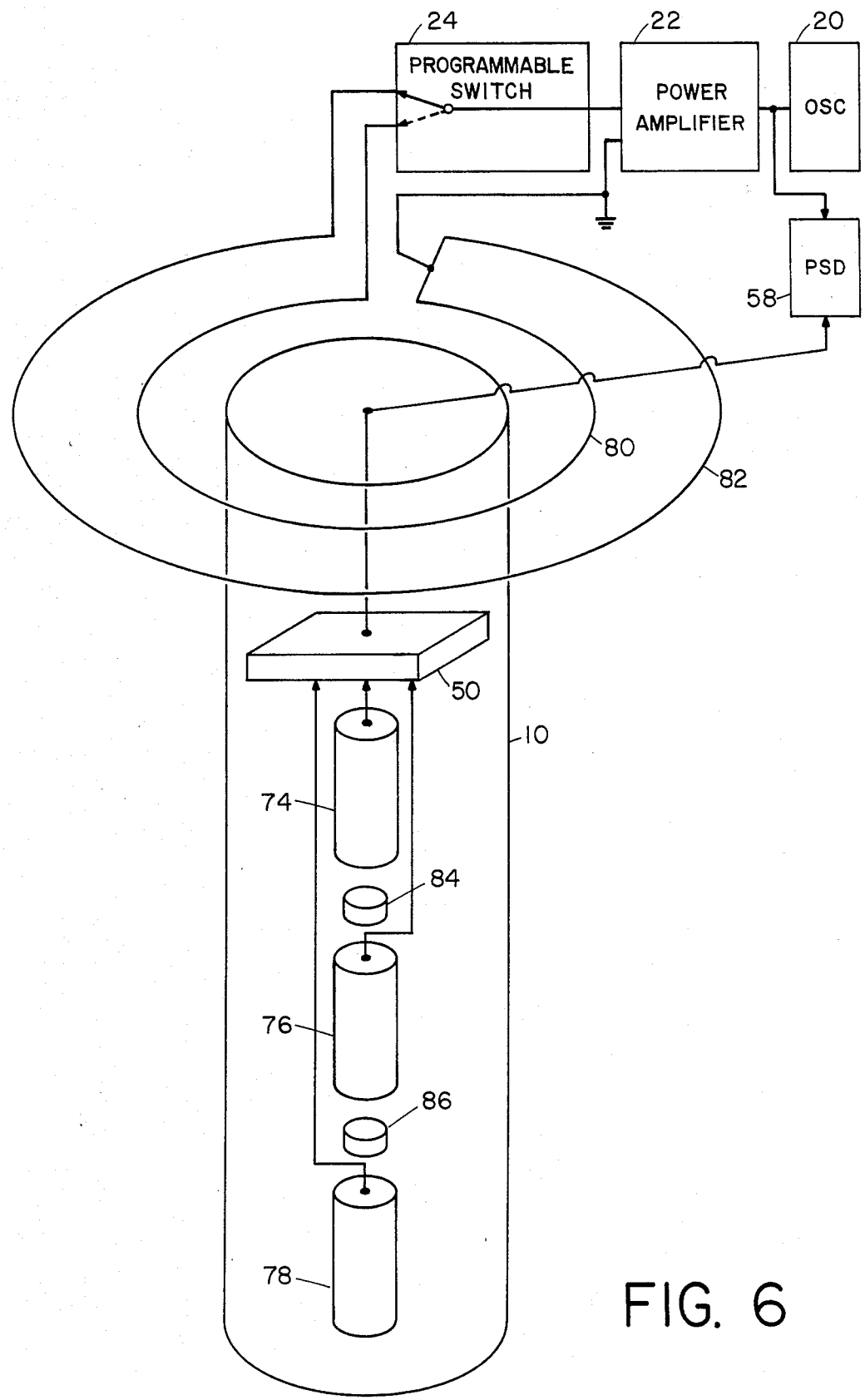

FIG. 6 is another embodiment of the invention wherein the sources of the exciting fields are A.C. current carrying loops of insulated wire on the surface of the earth which are concentric with the casing.

Figure 1:
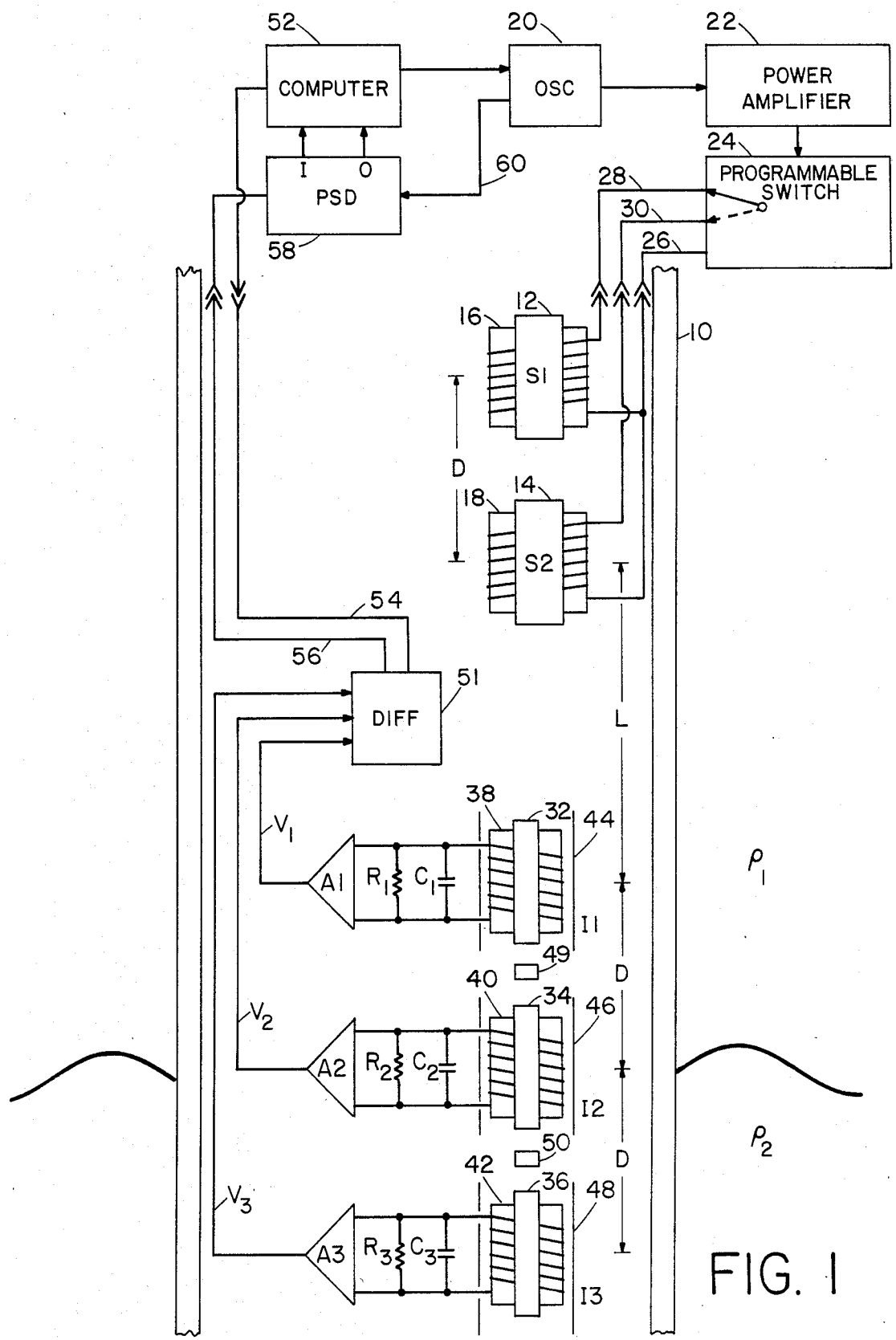
FIG. 1 is a section view of a preferred embodiment of the invention for induction logging in the presence of borehole casing.

FIG. 1 shows a preferred embodiment of the apparatus for induction logging within borehole casing 10 which surrounds the borehole itself. The formation has resistivities $\rho_1$, and $\rho_2$. High permeability materials 12 and 14 respectively are surrounded with windings 16 and 18 respectively which provide two independent sources of the primary excitation A.C. magnetic fields, solenoids S1 and S2 respectively.

The high permeability materials 12 and 14 respectively are constructed from mu-metal and a typical material is Permalloy 80 manufactured by Magnetics, Inc., located in Butler, Pennsylvania. The cores are approximately 1 inch by 1 inch square, being comprised of several stacks of long thin mu-metal strips each of which is 0.014 inch thick, ½ inch wide and 4 feet long. Approximately 200 turns of insulated #18 copper wire are used to fabricate windings 16 and 18 respectively.

A programable oscillator 20, which may be set to different frequencies and voltage amplitudes provides the input to a power amplifier 22 which provides a high power A.C. voltage and current source to programmable switch 24 which is an electronic switch.

Power amplifier 22 typically provides A.C. current at frequencies from 0.001 Hz to 20 Hz and currents of several amps peak-to-peak which is sufficient to generate A.C. magnetic fields of at least several gauss peak-to-peak in the immediate vicinity of solenoids S1 and S2.

Wire 26 is connected to both common sides of the coils 12 and 14 respectively. The programable switch initially energizes S1 when the output of the power amplifier is connected to wire 28 and the programable switch subsequently energizes S2 when the power amplifier is switched to wire 30. Programable switch 24 therefore alternately energizes S1 and S2 for fixed periods of time T each.

High permeability materials 32, 34, and 36 respectively are surrounded by insulated windings 38, 40, and 42 respectively which comprise three separate induction coils, I1, I2, and I3. High permeability material magnetic traps 44, 46, and 48 improve the performance of the induction coils in the presence of the casing. (For additional information on such magnetic traps, please refer to the U.S. Patent Application entitled "Oil Well Logging Tools Measuring Paramagnetic Logging Effect for Use in Open Boreholes and Cased Well Bores", W. B. Vail and P. B. Schwinberg, filed on Apr. 8, 1985, Ser. No. 720,943 U.S. Pat. No. 4,656,422.) Each of the induction coils are resonated with indentical center frequencies with capacitors C1, C2, and C3 respectively. In addition, the resistors R1, R2, and R3 trim the frequency responses of the induction coils so that they are identical. Amplifiers A1, A2, and A3 respectively amplify each voltage present providing three separate voltage outputs from the induction coil sensors, V1, V2, and V3.

The induction coils I1, I2, I3 are typically 6 foot long to achieve the overall required sensitivity. The cores 32, 34, and 36 are approximately 6 foot long, and are 1 inch by 1 inch square, being comprised of several stacks of long thin mu-metal strips each of which is 0.014 inch thick, ½ inch wide and 6 foot long. This provides a sensor whose length is at least ten times any other lateral dimension of the core. That is important, because long slender cores efficiently attract magnetic field lines (Electrical Methods in Geophysical Prospecting, Ibid., Pg. 237). Each lamination is electrically isolated by either a plastic spray coat or an insulating oxide layer to minimize eddy current losses. Typical of suitable materials used in cores is Permalloy 80 type mu-metal manufactured by Magnetics, Inc. Approximately 30,000 turns of #24 gauge insulated copper wire are wound on a coil form which holds the laminations in a bundle. The mass of magnetic material in the induction coil encourages magnetic flux outside the casing to concentrate in the magnetic cores of the induction coils.

The high permeability magnetic traps 44, 46, and 48 are constructed of the same individual thin mu-metal laminations as are in the core and are disposed radially around the induction coils. Laminations are each electrically isolated from one another. These traps are approximately the same length as the induction coils and have approximately the same total combined mass as the core.

In addition, the "magnetic weight" of a body may be defined as the weight times the relative permeability of the medium to air. The casing typically weighs 20 lbs/ft. and has a relative permeability of 100 so that it's "magnetic weight" is 2,000 lbs/ft. The 1 inch by 1 inch cores have a weight of 0.31 lbs/in but Permalloy 80 has a relative permeability in excess of 100,000 at low frequencies thereby producing a "magnetic weight" of greater than 30,000 lbs/ft for the core. Therefore, the sensor should have a "magnetic weight" which is equal or greater than the "magnetic weight" of the casing for optimum response.

The magnetic traps 44, 46, and 48 improve the response of the induction coils, although are not absolutely essential for operation. The highly magnetic cores will of course have fringing fields which interact the steel borehole casing. When the induction coils are resonated at a particular frequency with one of the capacitors C1, C2, or C3, then these fringing fields interact strongly with the wall of the casing which reduces the response of the coils by causing eddy current losses in the casing. However, the traps 44, 46 and 48 respectively, tend to "trap" the fringing fields from the ends of the cores thereby keeping these fields from interacting with the casing. Those fringing fields do not cause losses in the magnetic trap since the individual magnetic laminations of the trap are electrically isolated from one another. Ideally, the weight of the trap should be comparable to the weight of the cores, although substantial variations will still work. And the lengths of the traps are ideally equal to the lengths of the cores but may be as short as ½ as long to twice as long as the core lengths.

In addition, calibration coil 49 is disposed equidistant from induction coil I1 and induction coil I2. Similarly, calibration coil 50 is disposed equidistant from induction coils I2 and I3. As explained in U.S. patent applciation Ser. No. 720,943, U.S. Pat. No. 4,656,422, these coils are used to apply identical A.C. magnetic fields to each induction coil pair (I1 and I2 for example) when they are used in a differential manner. These calibration coils are comprised of 10 turns of insulated #18 gauge copper wire and are energized by simple circuitry which is not shown for simplicity. Such coils provide A.C. magnetic balancing means for the A.C. magnetic gradiometer.

The output voltages V1, V2, and V3 proceed to the programable difference electronics 51. Under command from the computer 52 over wire 54, differences in voltages from the various induction coils may be electronically provided as follows: $V_1-V_2$ and $V_2-V_3$. Electronics 51 also provides filtering, amplitude adjustment, and phase adjustment circuitry. The voltage output of the difference electronics 51 proceeds over wire 56 to the phase sensitive detector 58. The phase sensitive detector provides an in-phase output and an out-of-phase output wih respect to the oscillator reference signal provided to the phase sensitive detector by cable 60. The respective outputs of the phase sensitive detector are provided individually to the computer 52 for digital averaging and data analysis.

The excitation sources S1 and S2 are separated by a distance D and the three induction coils are also individually separated by the distance D. The center line of the high permeability material 32 is separated from the centerline of the high permeability material 14 by the distance L. In addition, means not shown are provided to house the various elements in the borehole tool as accustomed in the industry, to provide a wireline enclosing wires 26, 28, 30, 54, and 56, and to provide logging truck hardware and standard instrumentation.

The first step in the operation of the induction tool is to choose the operation frequency. Because the applied fields from the solenoids S1 and S2 must penetrate the casing, frequencies lower than 20 Hz must be used to measure formation properties. The lower limit of response of the induction coils is perhaps 0.001 Hz. Typically, 1 Hz will be chosen as the operation frequency. Then calibration coil 49 is energized with a 1 Hz signal (the circuitry necessary to do this is not shown for simplicity). Then, calibration coil 49 applies an identical A.C. magnetic field to induction coils I1 and I2. Then $C_1$ is chosen for resonating the coils at 1 Hz and $R_1$ is chosen to be approximately 50 K which sets the frequency response of I1. Then C2 and R2 are chosen to cause a null in the output signal of differential unit 51. Then, I1 and I2 respond identically even if the borehole casing adjacent to each of the coils has a different thickness or average resistivity. In this condition, the A.C. magnetic gradiometer is said to be balanced. The calibration coils 49 and 50 are each balancing means in this case. Also, since noise fluctuations in the geomagnetic field are the same at induction coils I1, I2 and I3, the differential output of any pair of induction coils is immune to the natural geomagnetic noise present!

When S1 is energized at the appropriate center frequency of the induction coils, it produces primarily a longitudinal magnetic field parallel to the borehole casing. For low frequencies, this A.C. magnetic field penetrates the casing subsequently causing eddy currents to flow in the geological formation in the vicinity of the borehole. The resulting flowing eddy currents cause an additional secondary A.C. magnetic field contribution, dB1, which is measured by measuring the voltage difference $V_1-V_2$. Similarly, when S2 is alternatively energized, dB2 is measured by measuring $V_2-V_3$. Differences between these two measurements $[(V_1-V_2)-(V_2-V_3)]$ are due entirely to differences in the resistivity of the formation over the vertical distance D, spurious casing contributions, and spurious fluid contributions in the hole. However, such differences are not due to direct coupling to the sources S1 and S2 as is required for proper operation. Such differential measurements provide a gradient in the resistivity of the formation, along with other information.

In addition, there is an interesting cross-check of the data using a vertical translation of the apparatus. Suppose that the apparatus is initially in a given vertical location and that solenoid S1 is used in conjunction with measurement induction coils I1 and I2 which results in a measurement of $V_2-V_1$. Since S1 and S2 are separated by the distance D, and I1, I2, and I3 are all separated by the distance D, then translating the apparatus vertically by the distance D should place the solenoid S2 and induction coils I2 and I3 respectively adjacent to the same formations initially measured. Therefore, measurements of $V_3-V_2$ here should be equal to the initial measurements of $V_2-V_1$.

Such gradient measurements on the formation may be provided at different frequencies provided computer control of C1, C2, and C3 and R1, R2, and R3 are provided appropriately. Both the frequency of the oscillator and its amplitude affect the degree of radial penetration of the formation. The spurious influence of pipe joints may be minimized if the distance D is much larger than the thickness of typical pipe joints. Furthermore, pipe joints are periodic with the length of casing. Therefore, the data at different vertical positions may be Fourier transformed with the period of the casing length, and this component may be removed mathematically.

In addition, information may be obtained from energizing just one source, S1 for example, and measuring the output from just one induction coil, V1, for example. Under appropriate circumstances, the average resistivity of the formation may be determined adjacent to the borehole using this method.

Figure 2:
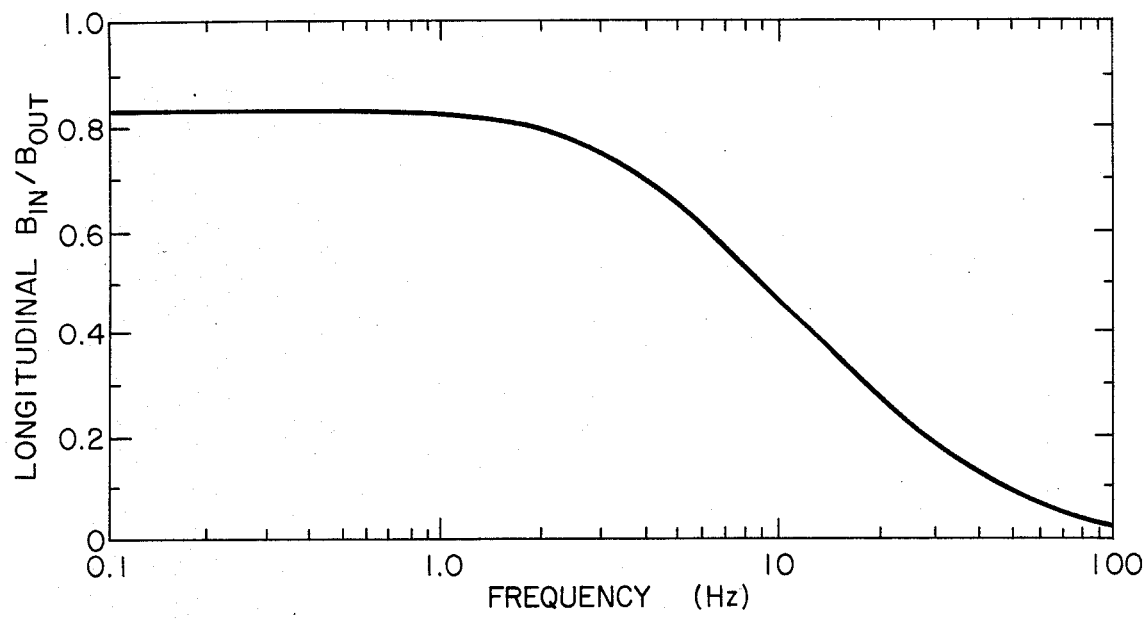
FIG. 2 is a plot of $B_{in}/B_{out}$ vs. frequency for longitudinal A.C. magnetic fields appleid to the exterior of a length of borehole casing.

FIG. 2 shows the longitudinal transfer characteristics ($B_{inside}/B_{outside}$) of an A.C. magnetic field applied to the outside of a length of borehole casing and subsequently measured on the interior of the casing. In these experiments a longitudinal A.C. magnetic field was applied to an 85 inch long length of $9\frac{5}{8}$ inch O.D. Type P110 borehole casing, with a wall thickness of 0.475 inches, which was manufactured by Nippon Steel, Inc. An air core induction coil was placed on the interior of the casing for these measurements. Clearly, below 10 Hz, these measurements prove that longitudinal A.C. magnetic fields substantially penetrate the casing.

These measurements show why frequencies below 20 Hz are used for measurements of longitudinal A.C. magnetic fields through borehole casing.

FIG. 3 shows the transfer characteristic ($B_{out}/B_{in}$) of an azimuthal field applied to the interior of a length of casing and subsequently measured on the outside of the casing for a short length of casing and for a long length of casing which are insulated from the earth. A short length of casing is anything shorter than 100 feet long and a long length of casing is anything longer than 1,000 feet long.

Here an insulated A.C. current carrying wire is placed inside various lengths of 7 inch O.D., $\frac{3}{8}$ inch wall thickness, Type K-55 casing manufactured by Valexy, Inc. The ratio of $B_{out}/B_{in}$ is plotted for the aximuthal field at various frequencies. Although the skin depth at the higher frequencies is only a small fraction of the thickness of the wall of the casing, circulating surface currents flowing simultaneously on the inside and outside of the pipe make the pipe effectively transparent to azimuthal fields for a short length of casing. For long lengths of casing, fields are strongly attenuated at frequencies above 20 Hz.

Each magnetic gradiometer comprised of two balanced induction coils, such as I1 and I2, can achieve remarkable measurementtn accuracy inside borehole casing. Without the traps 44 and 46, for example, measurement accuracies of $1 \times 10^{-9}$ gauss peak-to-peak with integration times of several seconds can be achieved. With the traps 44 and 46 included, for example, measurement accuracies of $1 \times 10^{-10}$ gauss peak-to-peak with integration times of several seconds can be achieved. These accuracies can be obtained in the presence of the noisy earth's geomagnetic field which has noise components of $1 \times 10^{-5}$ gauss peak-to-peak between 1 Hz to 10 Hz. Depending on the strength of the sources S1 and S2, A.C. magnetic fields due to the flowing currents are expected to be in the $10^{-6}$ gauss peak-to-peak range. Therefore, use of this precision A.C. magnetic gradiometer is necessary to elucidate the resistivity of the geological formation.

It is possible to separate out the contributions from the primary excitation fields, the casing, and the formation resistivity by varying the frequency of the apparatus. If only the solenoid S1 is energized, and only induction coils I1 and I2 are used in a gradiometer arrangement, then the output of the gradiometer can be measured at several different frequencies, for example at 1 Hz and 20 Hz. At 1 Hz, the output of the gradiometer is a function of the primary excitation field, the casing, and the resistivity of the formation. However, at 20 Hz for example, the output is dependent only on the primary excitation field and the casing but not on the resistivity of the formation because the primary excitation A.C. magnetic fields do no substantially penetrate the casing to the formation at 20 Hz. Similar sets of measurements using the other solenoid S2 but the some induction coils I1 and I2 then allows unique separation of the primary A.C. magnetic fields and the effects of the casing because the different vertical position of S2 changes the primary A.C. fields measured by the gradiometer considerably. Therefore, the formation resistivity can be uniquely obtained as desired. The process then can be repeated with induction coils I2 and I3.

FIG. 4 shows a conceptualized measurement situation inside a borehole casing. A primary excitation source of A.C. magnetic field 58 produces in general longitudinal ($B_z$), radial ($B_r$), and azimuthal ($B_\phi$) components of the A.C. magnetic field at any position within the formation. The formation resistivity and other physical parameters are a z, r, and $\phi$ which are coordinates shown in FIG. 4. For example, the formation resistivity $\rho$ is a function of z, r, and $\phi$ which is shown explicitly as $\rho(z, r, \phi)$ in FIG. 4.

The primary source fields generate eddy currents at any position of magnitude $J_z$, $J_r$, and $J_\phi$. These flowing currents then produce secondary fields $b_z$, $b_r$, and $b_\phi$. Along with the primary fields, these secondary fields are measured with longitudinal A.C. magnetic field sensors 60 and 62, whose respective outputs are differentially processed by electronics 64.

In general, the radial components $B_r$ do not penetrate the casing, and any components $b_r$ produced will not be measurable inside the casing. The source field $B_z$ can penetrate the casing at low frequencies, and the secondary component $b_z$ can be measured with induction coils as was the case in FIG. 1.

In FIG. 4, elements 60 and 62 are induction coils similar in nature to induction coils I1 and I2 described in FIG. 1 which are sensitive to longitudinal components of the A.C. magnetic field on the interior of the borehole casing. The calibration coil 63 is used to balance the gradiometer as already described for FIG. 1. Difference electronics 64 in FIG. 4 differentially subtracts the signals from induction coils 60 and 62 respectively and is the output of the A.C. magnetic gradiometer.

FIG. 5 shows yet another embodiment of the invention. Many of the elements have been defined, but here power amplifier 22 delivers current to electrode 66 placed in electrical contact with the casing. The current is subsequently conducted by various processes to electrode 68 which is in electrical contact with the surface of the earth.

Induction coils 70 and 72 are conceptually similar in nature to induction coils I1 and I2 in FIG. 1 and are responsive to only longitudinal components of the A.C. magnetic field inside the borehole casing. Calibration coil 73 is also shown which is used to balance the A.C. magnetic gradiometer. Here, A.C. currents which flow along the casing do not cause a signal output of the gradiometer because such currents do not produce magnetic fields with components parallel to the casing. However, the currents which flow through formation tend to flow along relatively less resistive zones. Various resistive zones are shown in FIG. 5 with resistivities respectively $\rho_1$, $\rho_2$, and $\rho_3$. For example, if $\rho_2 < \rho_1$ then more current would flow through $\rho_2$ than through $\rho_1$. Such A.C. currents would produce A.C. magnetic fields with longitudinal components inside the borehole casing and would therefore produce measurements indicating the relative resistivity of the adjacent formations. The difference in the outputs of the sensors performed by electronics 64 is sensitive to formation resistivities in different geological layers shown as $\rho_1$ $\rho_2$, and $\rho_3$ in FIG. 5.

FIG. 6 shows a variant of the invention shown in FIG. 1. Here many of the elements already have been defined. As is the case in FIG. 1, three induction coil assemblies 74, 76, and 78 respectively are sensitive to the secondary longitudinal magnetic fields sensed through the casing. However, the primary excitation A.C. magnetic fields are not generated from inside the casing, but instead are due to turns of insulated wire 80 and 82 respectively which are disposed on the surface of the earth and concentric with the borehole casing. However, the theory of operation of the embodiment of the invention shown in FIG. 6 is similar to that shown in FIG. 1. Wire 80 is typically 10 meters in diameter and is capable of carrying at least 10 amps peak-to-peak, and wire 82 is typically 20 meters in diameter and also capable of carrying 10 amps peak-to-peak. The frequency of operation is typically 0.001 Hz to 20 Hz to allow deep penetration of the earth, and to allow the A.C. magnetic fields to penetrate the casing. Calibration coils 84 and 86 are used to balance the appropriate pairs of the induction coils when performing differential measurements. First, wire 80 is energized, and induction coils 74 and 76 are used in a differential manner. Then, wire 82 is energized and induction coils 74 and 76 are still used in a differential manner. Two independent measurements at the same vertical position gives separately the formation and casing response. In addition, measurements at different frequencies such as 0.01 Hz, 1 Hz, and 10 Hz can be used to separate the casing and formation response.

In addition, it should be obvious that the source A.C. magnetic fields could in principle be placed anywhere with respect to the precision A.C. magnetic gradiometer. In particular, sources S1 and S2 in FIG. 1 could be in fact placed in a separate borehole some distance from borehole 10 in FIG. 1 and said measurements performed. In addition, electrical contact 66 in FIG. 5 could be placed just as well in a separate borehole which is either cased or not cased any distance from borehole 10 in FIG. 6 and said measurements performed. Therefore, the source fields and the precision A.C. magnetic gradiometer need not be in the same borehole.

And furthermore, the high precision A.C. magnetic gradiometer was explicitly designed to work inside conductive and magnetic steel borehole casing. However, it will respond slightly better if it is not surrounded by borehole casing. Therefore, the high precision A.C. magnetic gradiometer may be used in other geophysical exploration work inside uncased holes. It is still very useful for uncased holes because in the prior art, no practical devices have been constructed which measure A.C. magnetic fields to a sensitivity of $1 \times 10^{-10}$ gauss peak-to-peak at frequencies between 1 and 10 Hz with integration times of several seconds in the presence of much larger geomagnetic noise. In particular, current sources can be placed in one open borehole causing resulting A.C. magnetic fields depending on the A.C. current flow through relatively conductive formations and the precision A.C. magnetic gradiometer can be placed in another open borehole. Precision induction measurements can then be performed which yield properties of the relatively conductive formations.

While the above description contains many specificities, these should not be construed as limitations on the scope of the invention, but rather as exemplification of one preferred embodiment thereof. As has been briefly described, there are many possible variations. Accordingly, the scope of the invention should be determined not only by the embodiments illustrated, but by the appended claims and their legal equivalents.

I claim:

1. An apparatus for measurement of geological formation properties through conductive and magnetic steel borehole casing comprising at least one primary source of exciting A.C. magnetic fields positioned within the interior of the casing, where the frequency and amplitude of the A.C. fields are chosen to allow longitudinal and azimuthal components of said A.C. magnetic fields to penetrate the walls of the borehole casing thereby subjecting the adjacent formation to the exciting A.C. magnetic fields resulting in the production of eddy currents in the fomration which subsequently produce secondary A.C. magnetic fields characteristic of the formation whereby the longitudinal and azumuthal components of said secondary A.C. magnetic fields penetrate the wall of the casing to the interior of the borehole casing in combination with at least one magnetic field sensing means inside the borehole casing, vertically spaced from said primary source, responsive to the longitudinal components of said primary and secondary A.C. magnetic fields for providing measurements of characteristic formation properties including the resisitivity of the formation, wherein the frequency of the source of the exciting A.C. magnetic fields is between 0.001 Hz and 20 Hz thereby allowing the longitudinal and azimuthal components of said exciting A.C. magnetic fields to penetrate the walls of the conductive and magnetic steel borehole casing to the adjacent geological formation, wherein the amplitude of the exciting A.C. magnetic field exceeds one gauss peak-to-peak in the immediate vicinity of said exciting source inside the steel borehole casing which provides sufficient amplitude for measurement of said secondary A.C. magnetic fields which are generated by said eddy currents in said formation, and wherein said magnetic field sensing means responsive to said longitudinal A.C. magnetic fields is typically an induction coil which is comprised of insulated wire wound around high permeability magnetic material such as mu-metal which serves as the core of the induction coil, said high permeability material core being at least 10 times longer than any lateral dimension of the core which provides a sensitive induction coil capable of measuring the longitudinal components of said primary and secondary A.C magnetic fields inside conductive and magnetic steel borehole casing.

2. The apparatus as defined in claim 1 wherein the primary excitation A.C. magnetic fields are provided by an upper and lower solenoid which are disposed vertically in the cased borehole and which are alternatively energized with A.C. current of a given magnitude and at least two different frequencies, wherein the magnetic field sensing means inside the borehole casing responsive to said longitudinal components of said primary and secondary A.C. magnetic fields remains in the same vertical position inside the borehole casing and measurements are performed of said primary and secondary A.C. magnetic fields at the different frequencies when the upper solenoid is energized and at the different frequencies when the lower solenoid is energized whereby said measurements provide a means of subtracting the unwanted relatively large signal from borehole casing which may have a variable and unknown thickness and allows determination of the primary and secondary fields separately which therefore allows the measurement of the resistivity of the adjacent geological formation.

3. The apparatus as defined in claim 2 wherein the magnetic means to sense said secondary A.C. magnetic fields are three induction coils disposed vertically in the borehole, the upper two coils constituting an upper pair and the lower two coils constituting a lower pair, each vertical pair of which may be operated differentially to sense longitudinal components of the secondary magnetic fields wherein said upper pair of induction coils provide differential measurements when the upper solenoid is energized, and wherein said lower pair of induction coils provide differential measurements when the lower solenoid is energized, wherein each vertical pair of said induction coils is adjusted with an A.C. magnetic balancing means at each frequency such that they have identical responses to identical A.C. magnetic fields whereby measurements performed by each vertical pair of said balanced induction coils at each frequency provide measurement of A.C. magnetic fields much smaller than the noise components in the geomagnetic field and in addition, wherein said measurements performed by the said upper and lower pairs of induction coils are used at the different frequencies to subtract the relatively large unwanted signals from the borehole casing thereby allowing measurement of the resistivity and changes of the resistivity of the geological formation.

4. An apparatus as in claim 1 wherein the primary excitation A.C. magnetic fields are provided by conducting A.C. current of a magnitude of at least 100 milliamps peak-to-peak through the formation by conducting A.C. current through a vertically disposed insulated cable which makes electrical contact with the interior of the borehole casing thereby causing A.C. currents to flow through said formation to an electrode which is in electrical contact with the surface of the earth and disposed laterally from the cased borehole.

5. The apparatus as defined in claim 4 wherein said measurements of the longitudinal components of the primary and secondary A.C. magnetic fields are performed for a given magnitude of the A.C. current for at least two different frequencies thereby providing measurements of the formation parameters including the resistivity of the formation.

6. An apparatus for measurement of geological formation properties through conductive and magnetic steel borehole casing comprising at least one primary source of exciting A.C. magnetic fields on the surface of the earth, the frequency of the exciting A.C. fields being chosen to subject the subterranean formation to the exciting A.C. magnetic fields thereby resulting in the production of eddy currents in the formation which subsequently produce secondary A.C. magnetic fields characteristic of the formation whereby the longitudinal and azimuthal components of said secondary A.C. magnetic fields penetrate the wall of the casing to the interior of the borehole casing, in combination with at least one magnetic field sensing means positioned inside the borehole casing responsive to the longitudinal components of said primary and secondary A.C. magnetic fields, the frequency of the source of A.C. magnetic fields on the surface of the earth being between 0.001 Hz and 20 Hz thereby allowing said A.C. magnetic fields to penetrate the earth to great depths which causes eddy currents to flow in the geological formation which causes the subsequent generation of secondary A.C. magnetic fields at the same frequency which therefore penetrate the walls of the conductive and magnetic borehole casing whereby the longitudinal components of said primary and secondary A.C. magnetic fields are measured thereby providing characteristic formation properties including the resistivity of the geological formation.

7. The apparatus as defined in claim 6 wherein the primary excitation A.C. magnetic fields are provided by concentrically placed inner and outer insulated coils of wire which are located on the surface of the earth and are concentric with the borehole casing and which are alternatively energized with A.C. current of a given magnitude and at least two different frequencies, whereby the magnetic field sensing means inside the borehole casing responsive to said longitudinal components of said primary and secondary A.C. magnetic fields remains in the same vertical position inside the borehole casing and measurements are performed of said secondary A.C. magnetic fields at the different frequencies when the inner coils of wire are energized and at the different frequencies when the outer coils of wire are energized, whereby said measurements provdie a means of subtracting the unwanted relatively large signal from borehole casing which may have a variable and unknown thickness which therefore allows the measurement of the resistivity of the adjacent geological formation.

8. The apparatus as defined in claim 7 wherein the magnetic field sensing means to sense said primary and secondary A.C. magnetic fields are three induction coils disposed vertically in the borehole, each vertical pair of which may be operated differentially to sense longitudinal components of the primary and secondary A.C. magnetic fields wherein said upper pair of induction coils provide differential measurements when the outer concentric coil is energized, and wherein said lower pair of induction coils provide differential measurements when the inner concentric coil is energized, wherein each vertical pair of said induction coils is adjusted with an A.C. magnetic balancing means at each frequency such that they have identical responses to identical A.C. magnetic fields, whereby measurements performed by each vertical pair of said balanced induction coils at each frequency provide measurement of A.C. magnetic fields which are much smaller than the noise components in the geomagnetic field, and in addition, wherein said measurements performed by the said upper and lower pairs of induction coils at the different frequencies are used to subtract the relatively large unwanted signals from the borehole casing thereby allowing measurement of the resistivity and changes of the resisitivity of the geological formation.

9. The method of measurement of geological formation properties through conductive and magnetic steel borehole casing which comprises the steps of applying a longitudinal A.C. magnetic field on the interior of the borehole casing at one vertical position where the magnitude and frequency of the A.C. magnetic field is chosen to penetrate the wall of the casing thereby subjecting the adjacent formation to said A.C. magnetic field thereby resulting in the production of A.C. eddy currents in the geological formation which in turn produce secondary A.C. magnetic fields which subsequently penetrate the casing to the interior of the casing, measuring the longitudinal components of said primary and secondary A.C. magnetic fields on the interior of the casing, repetitively performing said measurements at many vertical positions within the borehole casing, wherein the frequency of the applied longitudinal A.C. magnetic field is between 0.001 Hz and 20 Hz thereby allowing the applied longitudinal A.C. magnetic field to penetrate the walls of the conductive and magnetic steel borehole casing to the adjacent geological formation, and wherein the amplitude of the applied A.C. magnetic field exceeds 1 gauss peak-to-peak in the immediate vicinity of the source of said A.C. magnetic field inside the steel borehole casing which provides sufficient amplitude for measurement of said secondary A.C. magnetic fields which are generated by said eddy currents in said formation, and determining from said measured longitudinal components characteristic parameters of the formation through borehole casing including the resistivity and changes in the resistivity of the geological formation.

10. The method of measurement of geological formation properties through conductive and magnetic steel borehole casing which comprises the steps of conducting A.C. current through an electrical contact with the interior of the borehole casing to an electrode in electrical contact with the surface of the earth, whereby said flowing A.C. currents selectively follow geological formations which are relatively less resistive than other adjacent geological formations, and whereby said flowing A.C. currents give rise to primary A.C. magnetic fields which in turn produce longitudinal components which penetrate to the interior of the borehole casing, and whereby said primary A.C. magnetic fields in addition cause the production of eddy currents in the geological formation which in turn produce secondary A.C. magnetic fields which possess longitudinal components which also subsequently penetrate the casing to the interior of the casing, measuring the longitudinal components of both the primary and secondary A.C. magnetic fields on the interior of the casing, repetitively performing said measurements at many vertical positions within the borehole casing thereby providing a method of measuring characteristic parameters of the formation through borehole casing including the resistivity and changes in the resisitivity of the geological formation, whereby the frequency of the A.C. current is chosen to be in the range from 0.001 Hz to 20 Hz to allow said longitudinal components of the A.C. magnetic field to penetrate the conductive and magnetic steel borehole casing, whereby the magnitude of the currents conducted from the casing to the surface of the earth have a magnitude of at least 100 milliamps peak-to-peak, which provides a sufficient magnitude A.C. magnetic field for measurement inside the casing, and determining from said longitudinal components a formation property.

11. The method of measurement of geological formation properties through conductive and magnetic steel borehole casing which comprises the steps of applying a primary A.C. magnetic field to the subterranean formation from a magnetic means located on the surface of the earth wherein the frequency of the applied A.C. magnetic field is between 0.001 Hz and 20 Hz which penetrates the formation to the depth of measurement thereby resulting in the production of eddy currents in the geological formation which in turn produce secondary A.C. magnetic fields which have longitudinal components at the casing which subsequently penetrate the casing to the interior of the casing, measuring the longitudinal components of said primary and said secondary A.C. magnetic fields on the interior of the casing, repetitively performing said measurements at many vertical positions within the borehole casing and determining from said measured longitudinal components characteristic parameters for the formation through aaid borehole casing including the resistivity and changes in the resistivity of the geological formation.

12. An apparatus for measurement of the properties of a geological formation through conductive and magnetic steel borehole casing comprising: a means of conducting A.C. current through an electrical contact with the interior of the borehole casing to an electrode on the surface of the earth, whereby said flowing A.C. currents selectively follow geological formations which are relatively less resistive than other adjacent geological formations, and whereby said flowing A.C. currents give rise to primary A.C. magnetic fields which in turn produce longitudinal components of A.C. magnetic fields which penetrate to the interior of the borehole casing, and whereby said primary A.C. magnetic fields in addition cause the production of eddy currents in the geological formation which in turn produce secondary A.C. magnetic fields which also posses longitudinal components which penetrate to the interior of the casing; at least one magnetic field measurement means sensitive to the longitudinal A.C. magnetic fields on the interior of the casing for repetitively measuring the longitudinal components of both the primary and secondary A.C. magnetic fields at many vertical positions within the borehole casing thereby providing indication of the presence of relatively conductive formations in the vicinity of the casing, said magnetic field measuring means providing an indication of characteristic parameters of the geological formation through said borehole casing including the resistivity and changes in the resistivity of the geological formation; the frequency of the source of the A.C. current being between 0.001 Hz to 20 Hz thereby allowing said longitudinal A.C. magnetic fields to penetrate the casing and whereby the magnitude of the current conducted to the electrode on the surface of the earth exceeds 100 ma peak-to-peak.

13. An apparatus for geophysical exploration of geological formations which are penetrated by a conductive and magnetic steel borehole casing comprised of a magnetic field generating means which subjects the geological formation to a source A.C. magnetic field and an A.C. magnetic gradiometer positioned within said casing which measures the longitudinal component of the total A.C. magnetic field inside the steel borehole casing whereby said A.C. magnetic gradiometer allows the measurement of very weak longitudinal A.C. magnetic fields which may be much smaller than the natural geomagnetic noise inside the borehole casing, wherein said A.C. magnetic gradiometer is comprised of at least two vertically disposed induction coils which are initially adjusted to have identical responses to identical applied longitudinal A.C. magnetic fields using an A.C. magnetic balancing means whereby said induction coils are operated in a differential manner which provides an output which is relatively immune to the noise in the geomagnetic field and is responsive to only those A.C. magnetic fields which are different in magnitude and phase at the two induction coils, and wherein said induction coils are comprised of windings of insulated wire surrounding a high permeability magnetic core which is manufactured from material such as mu-metal, the length of said core being more than 10 times longer than any lateral dimension of the core, and the frequency of the A.C. magnetic field is in the range of 0.001 Hz to 20 Hz to allow the longitudinal components of the source A.C. magnetic field to penetrate the borehole casing.

14. The apparatus defined in claim 13 wherein each induction coil comprised of insulated windings of copper wire surrounding a high permeability core is also surrounded with a magnetic trap which is concentrically disposed around the outside of the windings and is disposed between the windings and the inner wall of the borehole casing and which is fabricated from high permeability material such as mu-metal which improves the response of the induction coils by preventing the production of eddy current losses in the borehole casing from the fringing fields at the ends of the cores of the induction coils.

15. The apparatus as defined in claim 13 wherein the A.C. magnetic gradiometer is located in a conductive and magnetic steel borehole casing and the source A.C. magnetic field is also within said cased borehole.

16. The apparatus as defined in claim 13 wherein the A.C. magnetic gradiometer is located in a conductive and magnetic steel borehole casing and the source A.C. magnetic field is derived from a means which conducts A.C. current from the inside of said casing to a surface electrode.

17. The apparatus as defined in claim 13 wherein the A.C. magnetic gradiometer is located in a conductive and magnetic steel borehole casing and the source A.C. magnetic field is derived from a means which conducts A.C. current from the inside of a second well bore to a surface electrode whereby said second well bore may be an open hole or a cased well bore.

18. An apparatus for geophysical exploration of geological formations which are penetrated by a conductive and magnetic steel borehole casing comprised of a means of conducting at least 100 milliamps peak-to-peak of A.C. current from the interior of the borehole casing to an electrode on the surface of the earth whereby said A.C. current preferentially follows relatively conducting geological strata thereby producing resulting A.C. magnetic fields which have longitudinal components at a given vertical location along the casing which penetrate the wall of the casing to the interior of the casing, and an A.C. magnetic gradiometer positioned within said casing which measures the longitudinal component of the the resulting A.C. magnetic field inside the borehole casing whereby said A.C. magnetic gradiometer allows the measurement of very weak longitudinal A.C. magnetic fields which may be much smaller than the natural geomagnetic noise inside the borehole casing, wherein said A.C. magnetic gradiometer is comprised of at least two vertically disposed induction coils which are initially adjusted to have identical responses to identical applied longitudinal A.C. magnetic fields using an A.C. magnetic balancing means whereby said induction coils are operated in a differential manner which provides an output which is relatively immune to the noise in the geomagnetic field and is responsive to only those A.C. magnetic fields which are different in magnitude and phase at the two induction coils, and wherein said induction coils are comprised of windings of insulated wire surrounding a high permeability magnetic core which is manufactured from material such as mu-metal whereby the length of said core is more than 10 times longer than any lateral dimension of the core, and the frequency of the A.C. current is in the range of 0.001 Hz to 20 Hz to allow the longitudinal components of the resulting A.C. magnetic field to penetrate the borehole casing.

19. The apparatus defined in claim 18 wherein each induction coil comprised of insulated windings of copper wire surrounding a high permeability core is also surrounded with a magnetic trap which is concentrically disposed around the outside of the windings and is disposed between the windings and the inner wall of the borehole casing and which is fabricated from high permeability material such as mu-metal which improved the response of the induction coils by preventing the production of eddy current losses in the borehole casing from the fringing fields at the ends of the cores of the induction coils.

20. An apparatus for geophysical exploration of a geological formation which is penetrated by at least one open borehole comprising a means for conducting A.C. current between two electrodes which are in electrical contact with said geological formation, wherein A.C. current is provided at a frequency selected between 0.001 Hz and 20 Hz of a magnitude of at least 100 milliamps peak-to-peak whereby said A.C. current selectively follows relatively less resistive strata in the geological formation thereby producing A.C. magnetic fields characteristic of said strata, and at least one precision A.C. magnetic gradiometer disposed within said open borehole which is capable of measuring A.C. magnetic fields smaller than the natural magnetic noise in the geomagnetic field whereby said A.C. magnetic gradiometer is comprised of a pair of induction coils which are disposed vertically in the borehole and which may be operated differentially to sense the longitudinal components of any A.C. magnetic fields present wherein each induction coil is comprised of insulated wire wound around high permeability magnetic material such as mu-metal which serves as the core of the induction coil, said high permeability core material being at least 10 times longer than any lateral dimension of the core, and wherein each vertical pair of said induction coils is adjusted with an A.C. magnetic balancing means at each frequency such that the individual induction coils comprising the gradiometer have identical responses to identical A.C. magnetic fields and the differential output of the A.C. magnetic gradiometer is sensitive primarily to only those components of the A.C. magnetic field which have different magnitudes and phases at the different vertical locations of the induction coils whereby said differential output is therefore relatively immune to magnetic noise fluctuations in the geomagnetic field.

21. The apparatus in claim 20 wherein one of the electrodes in electrical contact with the geological formation is in electrical contact with the interior of the open borehole which contains the A.C. magnetic gradiometer and the other electrode is in electrical contact with the surface of the earth.

22. The apparatus in claim 20 wherein one of the electrodes in electrical contact with the geological formation is in electrical contact with the interior wall of one open borehole, the A.C. magnetic gradiometer is located in a second open borehole, and the other electrode is in electrical contact with the surface of the earth.

23. The apparatus in claim 20 wherein one of the electrodes in electrical contact with the geological formation is in electrical contact with the interior wall of the open borehole containing the A.C. magnetic gradiometer and the other electrode is in electrical contact with the interior wall of another second open borehole.

* * * * *